(12) United States Patent
Black

(10) Patent No.: US 6,239,737 B1
(45) Date of Patent: May 29, 2001

(54) METHOD AND APPARATUS FOR ATTACHING A RADIO FREQUENCY TRANSPONDER TO AN OBJECT

(75) Inventor: Donald Black, Erie, CO (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 08/275,986

(22) Filed: Jul. 15, 1994

(51) Int. Cl.[7] .................................................... G01S 13/74
(52) U.S. Cl. ............................. 342/51; 342/44; 340/572; 411/378; 411/383; 411/411
(58) Field of Search ..................... 342/51, 42, 44, 342/175; 340/572; 411/378, 383, 411

(56) References Cited

U.S. PATENT DOCUMENTS

| | | | |
|---|---|---|---|
| 3,611,398 | * | 10/1971 | Schnetzer . |
| 4,104,630 | * | 8/1978 | Chasek ................................... 342/44 |
| 4,129,855 | * | 12/1978 | Rodrian ................................... 342/44 |
| 4,140,040 | * | 2/1979 | Modrey ..................................... 85/74 |
| 4,299,870 | * | 11/1981 | Humble ................................. 428/101 |
| 4,373,159 | * | 2/1983 | Leavitt et al. ......................... 342/44 |
| 4,502,717 | * | 3/1985 | Close ................................... 292/316 |
| 4,503,424 | * | 3/1985 | Evenwoll .............................. 340/617 |
| 4,737,789 | * | 4/1988 | Nysen ..................................... 342/51 |
| 4,774,503 | * | 9/1988 | Bussard ................................ 340/572 |
| 4,813,564 | * | 3/1989 | Cooper et al. ........................ 215/366 |
| 4,851,609 | * | 7/1989 | Reddy .............................. 174/35 R |
| 4,876,554 | * | 10/1989 | Tubbs ................................... 343/780 |
| 4,899,583 | * | 2/1990 | Booker ............................... 73/170 R |
| 4,921,382 | * | 5/1990 | Fries et al. ............................. 411/45 |
| 4,931,664 | * | 6/1990 | Knoll ............................... 340/426 X |
| 4,945,354 | * | 7/1990 | McColl .......................... 340/825.31 |
| 4,980,689 | * | 12/1990 | Kawakami ............................. 342/51 |
| 5,003,260 | * | 3/1991 | Auchterlonie .................. 324/207.16 |
| 5,018,921 | * | 5/1991 | Pinney ................................. 411/393 |
| 5,022,244 | * | 6/1991 | Charlot, Jr. ........................... 70/57.1 |
| 5,065,160 | * | 11/1991 | Kawakami ............................. 342/51 |
| 5,095,240 | * | 3/1992 | Nysen et al. ...................... 342/44 X |
| 5,140,836 | * | 8/1992 | Hogan et al. ......................... 70/57.1 |
| 5,146,235 | * | 9/1992 | Frese ................................... 343/895 |
| 5,172,121 | * | 12/1992 | Beecher ................................. 342/51 |
| 5,174,703 | * | 12/1992 | White ................................... 411/107 |
| 5,196,846 | * | 3/1993 | Brockelsby et al. ............... 342/44 X |
| 5,246,078 | * | 9/1993 | Kryger et al. ......................... 175/18 |
| 5,387,102 | * | 2/1995 | Wagner et al. ...................... 433/173 |
| 5,433,096 | * | 7/1995 | Janssen et al. ........................ 70/278 |
| 5,474,631 | * | 12/1995 | Bowman ............................... 156/160 |
| 5,774,060 | * | 6/1998 | Ostermann et al. ............ 340/825.31 |
| 5,823,028 | * | 10/1998 | Mizuno et al. ........................ 70/278 |
| 5,836,187 | * | 11/1998 | Janssen et al. ......................... 70/252 |

* cited by examiner

Primary Examiner—John B. Sotomayor
(74) Attorney, Agent, or Firm—Wells, St. John, Roberts, Gregory & Matkin

(57) ABSTRACT

A method and apparatus for attaching a RF/ID transponder to an object is described. The transponder is integrated within an attaching device to protect the transponder from damage, hazardous environments and tampering. Further, by integrating the transponder within the attaching device, the device can be countersunk to further protect the transponder. Further still, manufacturing the device from a non-ferrous material prevents degradation of the transponder reading range.

31 Claims, 4 Drawing Sheets

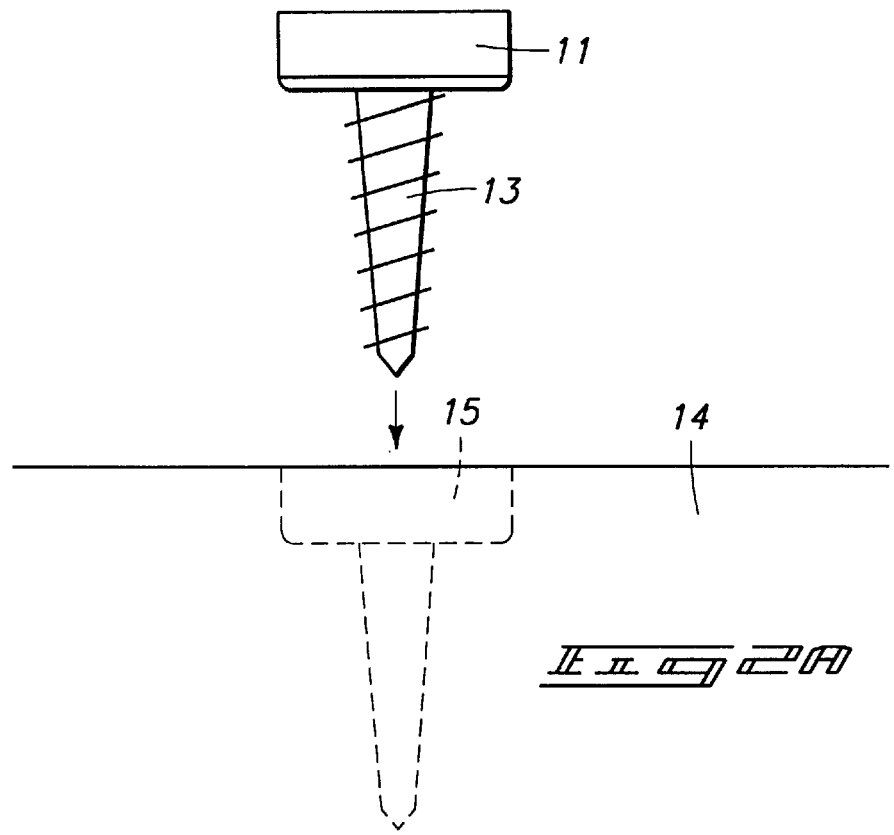
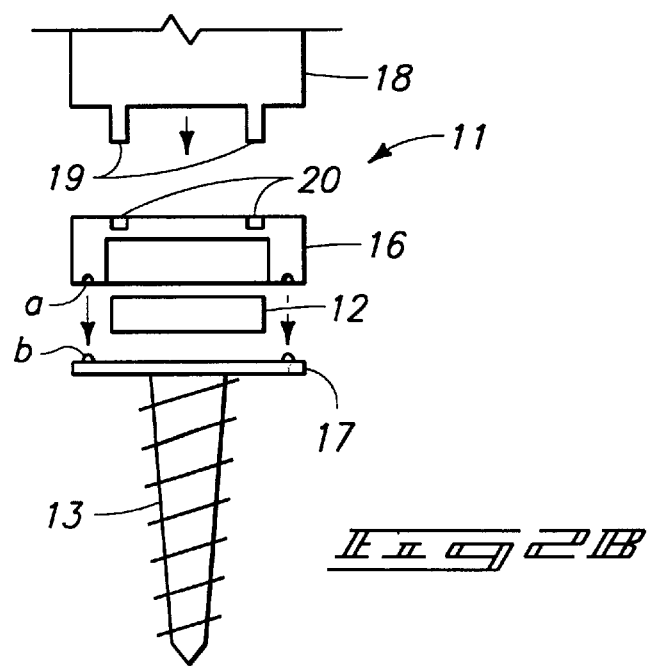

METHOD AND APPARATUS FOR ATTACHING A RADIO FREQUENCY TRANSPONDER TO AN OBJECT

BACKGROUND OF THE INVENTION

1. Field of the Invention

The present invention relates to the field of electronic identification of objects and, more specifically, to a method and apparatus of attaching a radio transponder to an object which is to be identified.

2. Brief Description of the Prior Art

Radio Frequency Identification of objects (RF/ID) involves wireless object identification. RF/ID is generally composed of two components—a reader and a transponder; the latter is commonly called an RF tag. In the field of RF/ID, there are various methods for attaching the transponder to the object to be identified. All these methods have significant drawbacks. For example, the most prevalent method of attaching a transponder to an object is by gluing the object and transponder together with epoxy or some other chemical. Unfortunately, the transponder can be easily removed and is not capable of withstanding harsh environments. Another common method of attaching a transponder to an object is lo use a circular transponder with a hole in the center. The resulting device is then mounted to the object to be identified with a screw or bolt. There are several drawbacks to this method. Specifically, the range of reading the transponder is reduced if a metallic fastening device is incorporated in the attachment, the transponder is easily removed from the object to be identified, the use of non-metallic fasteners combined with the transponder protruding from the object to be identified do not provide adequate protection from mechanical damage, and use of an attachment device separate from the transponder makes aesthetic installation very difficult.

Accordingly, an object of the present invention is to provide a method and apparatus for attaching a radio frequency transponder to an object. A further object of the present invention is to provide a method and apparatus for attaching a radio frequency transponder to an object wherein the transponder cannot be easily removed. A still further object of the present invention is to provide a method and apparatus for attaching a radio frequency transponder to an object wherein the transponder can withstand a harsh environment. Another object of the present invention is to provide a method and apparatus for attaching a radio frequency transponder to an object wherein the range of reading the transponder is not dramatically reduced. Yet another object of the present invention is to provide a method and apparatus for attaching a radio frequency transponder to an object while maintaining an aesthetic installation.

These and other objects will become readily apparent to those skilled in the art and are met by the present invention as described and claimed.

SUMMARY OF THE INVENTION

The present invention is directed to a method and apparatus for attaching a radio frequency transponder to an object by using an attaching device constructed of plastic or some other non-ferrous material. Specifically, the attaching device is manufactured to allow a radio frequency transponder to become an integral part of the device. For example, the attaching device may be a integrated within a screw head and the screw head may be bevelled in a counterclockwise direction, or similar locking means, to prevent tampering with or removal of the device. With the transponder safely housed within the attaching device, the transponder can withstand harsh environments. Further, manufacturing the attaching device with non-ferrous material will allow the transponder to maintain an effective range for reading. Further still, the integration of the transponder into the attaching device results in an aesthetic design.

BRIEF DESCRIPTION OF THE DRAWINGS

FIG. 2A is a side view of an embodiment of the present invention incorporating an RF/ID transponder into a screw attaching device.

FIG. 2B is a cross-section of the embodiment shown in FIG. 2A and including a locking device.

DETAILED DESCRIPTION OF PREFERRED EMBODIMENTS

Figure 1:
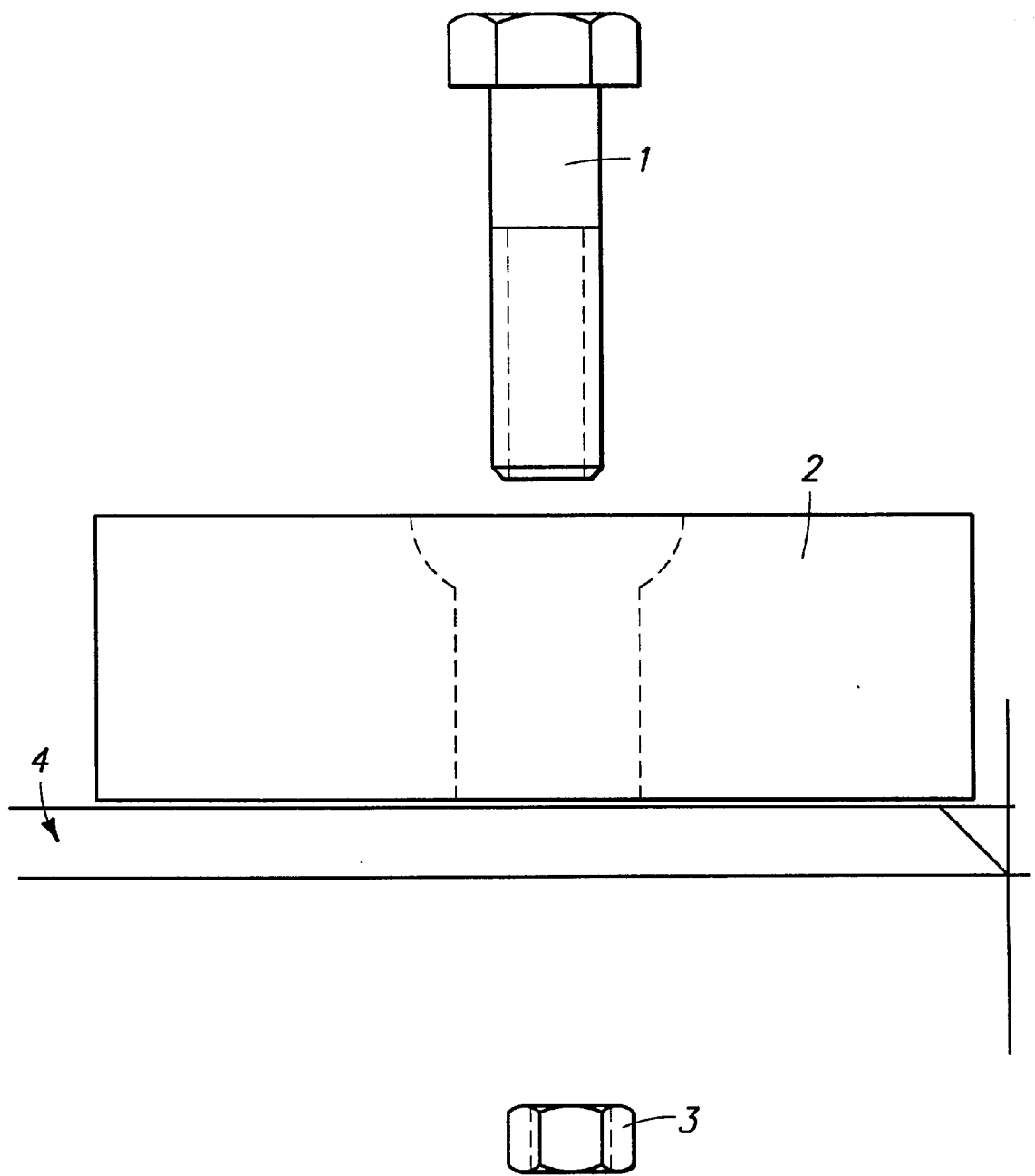
FIG. 1 is a side view of a prior art method and apparatus of attachment of a radio frequency transponder device.

FIG. 1 is a drawing of a prior art method and apparatus for attaching an RF/ID transponder (tag) 2 to an object 4. The prior art method and apparatus requires the use of a separate screw or nut 1 and bolt 3 arrangement to attach an RF/ID transponder 3. This method and apparatus has the associated reliability problems, read range problems, and inability to prevent tampering as discussed above.

FIG. 2A is a side view and partial cross-section showing an embodiment of the present invention incorporating an RF/ID transponder (tag) into a screw. In this embodiment, the attaching device comprises a screw head 11 having a transponder (not shown) enclosed within the head and a screw 13. The attaching device comprising screw head 11 and screw 13 is then screwed into an object 14. In a preferred embodiment, the object 14 includes a countersink 15 to fully enclose screw head 11 thereby providing a smooth, aesthetically pleasing surface on the object 14. Countersinking the attaching device also allows the transponder to not protrude from the object, further protecting the transponder from damage.

FIG. 2B is a cross section of the screw head 11. As shown, screw head 11 comprises a housing 16 for containing a transponder 12. The transponder 12 is placed inside the housing 16. The housing 16 is then attached to a cover 17 by using ultrasonic welding, epoxy, or other plastic attaching methods available to those skilled in the art. Alignment of the housing 16 with the cover 17 can be achieved by using small openings a and fingers b. The cover 17 is then attached to a screw 13 to complete the device. As will be readily apparent to those skilled in the art, the cover 17 and screw 13 can be a uniform singular member and not comprised as two parts as shown.

By incorporating the transponder 12 within the screw head 11, numerous advantages are achieved. Specifically, the transponder becomes part of the attaching device and is secured to the object to the extent that the screw is secured. Further, incorporating the transponder within a non-ferrous housing allows the transponder to operate with little or no perceivable degregation in transponder reading range. Further still, incorporating the transponder within a screw head 11, allows the entire transponder to be countersunk within an object 14 providing a safe, non protruding design and an aesthetically pleasing smooth surface.

Figure 2C:
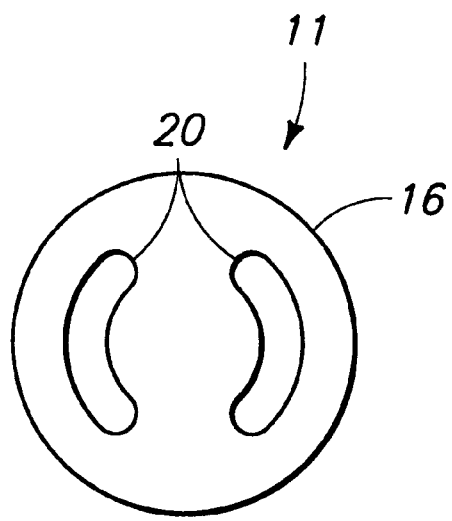
FIG. 2C is a top view of the embodiment shown in FIG. 2B.

Also shown in FIG. 2B is an embodiment of a locking device 18 comprising two fingers 19 to be inserted into slots 20 of the screw head 11 for locking same. FIG. 2C is a top view of the screw head 11 incorporating the receiving slots 20 which are formed within the housing 16. The receiving slots are bevelled and adapted so that the fingers 19 of the locking device 18 can be received in the slots for turning the screw into the object. By bevelling the slots, the screw head can be screwed within the object but not unscrewed and tampered with. As will become readily apparent to those skilled in the art, various screw locking devices can be incorporated within the screw head 11 for screwing the screw into the object 14 while preventing unauthorized tampering or unscrewing of same.

Figure 3B:
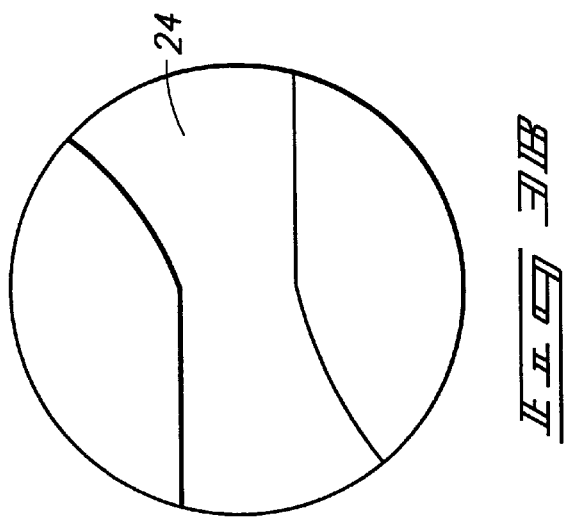
FIG. 3B is a top view of the embodiment shown in FIG. 3A.
Figure 3A:
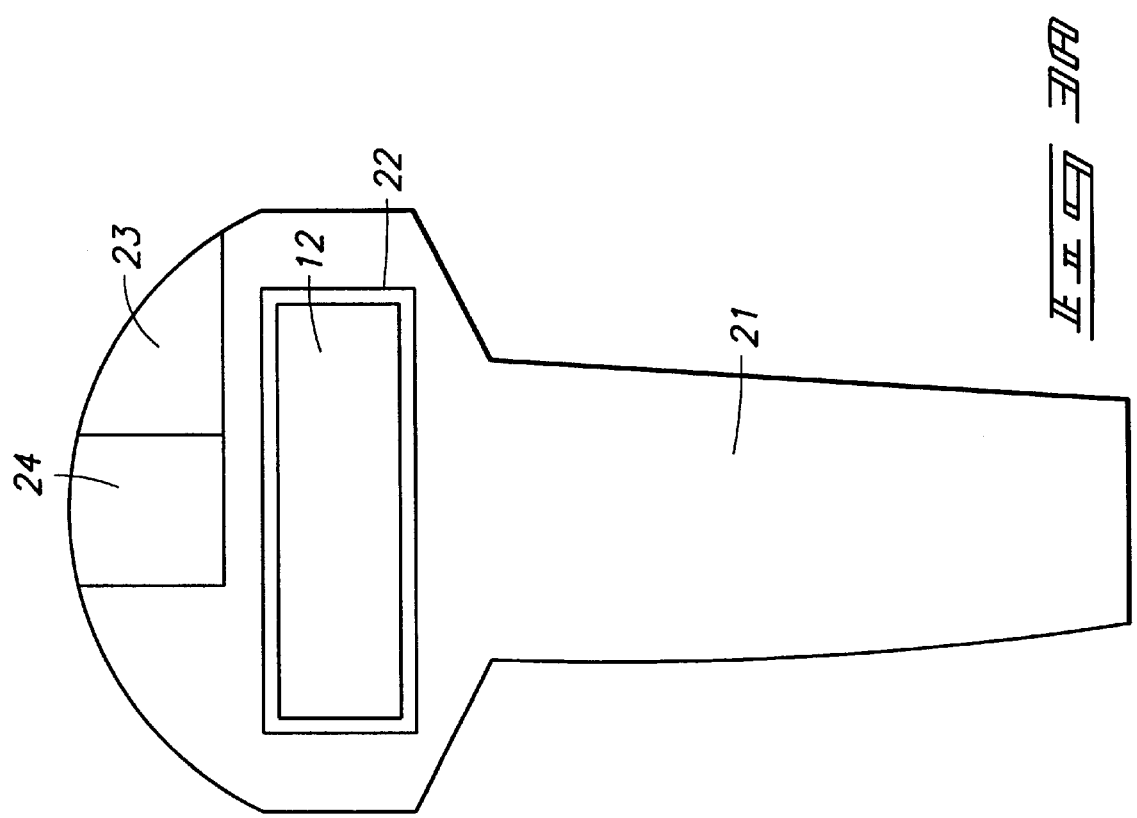
FIG. 3A is a cross-section of an alternate embodiment of the present invention incorporating an RF/ID transponder into a screw.

FIG. 3A is a cross section showing an alternative embodiment of the present invention incorporating an RF/ID transponder into a screw. As shown, the attaching device includes a screw 21 formed having an open chamber 22 for receiving a transponder 12. Preferably, the screw is formed of non-ferrous material, for example plastic. The transponder 12 is then placed within the chamber 22 and is then sealed within the chamber by filling same with epoxy or other resin type material. Alternatively, the entire screw could be made of epoxy resin to allow for a unitary body construction with no additional steps for sealing; the transponder being implemented within the screw during the screw molding process.

FIG. 3B is a top view of the screw head 23 shown in FIG. 3A. As can be seen by FIG. 3B, the configuration of the screw slot 24 provides for a one-way screw locking device to allow the screw to be inserted into the object and not removed.

Figure 4:
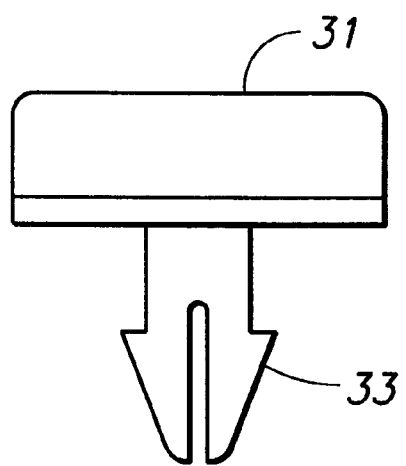
FIG. 4 is a side view of an alternate embodiment of the present invention incorporating an RF/ID transponder into a snap attaching device.
Figure 5:
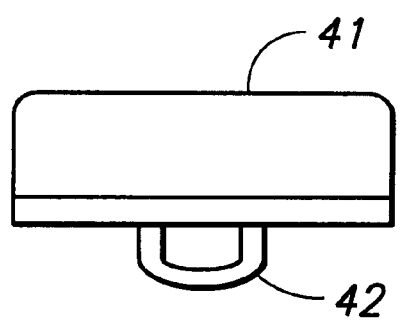
FIG. 5 is a side view of an alternate embodiment of the present invention incorporating an RF/ID transponder into a button.

FIGS. 4 and 5 illustrate alternate embodiments of the present invention. FIG. 4 is an illustration of incorporating an RFD transponder into a snap attaching device. In this embodiment, the transponder is incorporated into the snap head 31 which is attached to a snap 33. FIG. 5 is an illustration of the present invention incorporating an RF/ID transponder into a button. The RF/ID transponder is encased into a button head 41 which is attached to a button button hook 42.

As will become readily apparent to those skilled in the art, the RF/ID transponder can be incorporate into other attaching mechanisms to form an attaching device in accordance with the present invention.

What is claimed is:

1. A transponder module comprising:
    a housing including a fastener having a head portion coupled to a screw portion, the head portion being formed from plastic and including a substantially flat surface formed opposite the screw portion, the head portion including a chamber; and
    a transponder contained in the chamber of the head portion.

2. The transponder module of claim 1, wherein the head portion and the screw portion both are formed from molded plastic.

3. The transponder module of claim 1, wherein the head portion includes a beveled slot formed in the substantially flat surface allowing the screw portion to be screwed into an object but not allowing removal of the fastener from the object.

4. The transponder module of claim 1 wherein the housing forms a one way screw and wherein the head portion is countersunk to wherein the housing does not protrude from the object.

5. The transponder module of claim 1 wherein the housing is formed from epoxy.

6. The transponder module of claim 1 wherein the housing is formed as a single piece.

7. The transponder module of claim 1 wherein the housing is formed as a single piece of molded epoxy.

8. A transponder module comprising:
    a molded plastic housing having a head portion and an attachment portion, the head portion including a chamber; and
    a RF transponder contained in the chamber of the head portion.

9. The transponder module of claim 8 wherein the molded plastic housing comprises a molded epoxy housing.

10. The transponder module of claim 8 wherein the molded plastic housing comprises a screw.

11. The transponder module of claim 8 wherein the molded plastic housing comprises a snap.

12. The transponder module of claim 8 wherein the molded plastic housing comprises a button.

13. The transponder module of claim 8 wherein the molded plastic housing comprises a single-piece housing configured to be countersunk into an object.

14. The transponder module of claim 8 wherein the molded plastic housing comprises a single-piece, one-way, locking screw.

15. A transponder housing comprising:
    a plastic head configured to be countersunk and including a chamber configured to encapsulate a transponding module; and
    attachment means coupled to the plastic head.

16. The housing of claim 15 wherein the attachment means comprises a screw, and the housing forms a single-piece, one-way, locking screw.

17. The housing of claim 15 wherein the attachment means comprises a snap.

18. The housing of claim 15 wherein the attachment means comprises a button hook.

19. The housing of claim 15 wherein the chamber houses a RF transponder.

20. A method of attaching a RF transponder to an object comprising:
    forming a single piece housing including a head coupled to attachment means, the head including a chamber housing the RF transponder; and
    coupling the attachment means to the object.

21. The method of claim 20 wherein forming a housing includes forming a screw having the head coupled to a threaded shaft by molding plastic to form a countersunk screw.

22. The method of claim 20 wherein forming a housing includes forming a screw having the head coupled to a threaded shaft by molding plastic to form a one-way, locking screw.

23. The method of claim 20 wherein forming a housing includes forming a screw having the head coupled to a threaded shaft by molding epoxy to form a one-way, locking, countersunk screw.

24. A transponder module comprising:
- a housing including a fastener having a head portion coupled to a screw portion extending from the head portion and including an external thread, the head and screw portions being formed from non-ferrous materials, the head portion including a substantially flat surface formed opposite the screw portion and coupled to the screw portion via a beveled portion configured to countersink the head portion in response to the head portion being screwed into an object intended to bear the transponding module, the head portion including a slot having two sides, each side being partially bevelled and configured to facilitate one-way screw insertion of the screw portion and also configured to not facilitate removal thereof, the head portion including a chamber; and
- a transponder contained in the chamber of the head portion.

25. The transponder module of claim 24, wherein the head portion and screw portion comprise a one-piece molded epoxy resin housing.

26. The transponder module of claim 24, wherein the screw portion comprises plastic.

27. A transponder module comprising:
- a housing including a fastener having a head portion coupled to a screw portion extending from the head portion and including an external thread, the head portion being formed from non-ferrous materials, the head portion including a substantially flat surface formed opposite the screw portion and coupled to the screw portion via a beveled portion configured to countersink the head portion in response to the head portion being screwed into an object intended to bear the transponding module, the head portion including a slot having two sides, each side being partially bevelled and configured to facilitate one-way screw insertion of the screw portion and also configured to not facilitate removal thereof, the head portion including a chamber; and
- a transponder contained in the chamber of the head portion.

28. The transponder module of claim 27, wherein the head portion and the screw portion both are formed from molded plastic.

29. The transponder module of claim 27, wherein the screw portion is formed from molded plastic.

30. A transponder module comprising:
- a housing including a fastener having a head portion coupled to a screw portion extending from the head portion and including an external thread, the head and screw portions forming a single piece of molded epoxy, the head portion including a substantially flat surface formed opposite the screw portion and coupled to the screw portion via a beveled portion configured to countersink the head portion in response to the head portion being screwed into an object intended to bear the transponding module, the head portion including a slot having two sides, each side being partially bevelled and configured to facilitate one-way screw insertion of the screw portion and also configured to not facilitate removal thereof, the head portion including a chamber; and
- a transponder contained in the chamber of the head portion.

31. A radio frequency transponder module comprising:
- a housing, the housing including:
    - a shank portion including an external thread configured to be threadedly engaged to an object to be identified by the radio frequency transponder module, the shank portion tapering from a first diameter at a first end to a second diameter at a second end, the second end being larger than the first end;
    - a first head portion having a first and second opposed surfaces, the first surface coupled to the second end of the shank portion, the head portion including a circular platform having a diameter greater than the second diameter, the head portion including a plurality of raised bumps extending outwardly from the second surface and defining therebetween an area;
    - a second head portion comprising a non-ferrous material and including an annular wall and a top extending across an upper surface of the annular wall, the annular wall including a plurality of openings formed in a lower surface thereof, each of the openings being configured to mate to a respective one of the plurality of bumps to secure the second head portion to the first head portion and thereby enclose a cavity therebetween, the top including a plurality of arcuate blind openings formed therein;
    - a third head portion comprising a non-ferrous material, the third head portion comprising a generally cylindrical shape and including a plurality of arcuate lugs formed on a lower surface of the generally cylindrical shape, each of the plurality of arcuate lugs being configured to mate with a respective one of the arcuate blind openings to secure the third head portion to the second head portion, the third head portion including a top surface having a slot formed therein having two sides, each side being partially bevelled and configured to facilitate one-way screw insertion of the shank portion and also configured to not facilitate removal thereof; and
- a radio frequency identification transponder contained in the cavity between the first and second head portions.

\* \* \* \* \*

UNITED STATES PATENT AND TRADEMARK OFFICE
CERTIFICATE OF CORRECTION

PATENT NO. : 6,239,737 B1
DATED : May 29, 2001
INVENTOR(S) : Donald Black

Page 1 of 1

It is certified that error appears in the above-identified patent and that said Letters Patent is hereby corrected as shown below:

Column 1,
Line 25, replace "lo" with -- to --.

Signed and Sealed this

Fifteenth Day of January, 2002

*Attest:*

JAMES E. ROGAN
*Attesting Officer*     *Director of the United States Patent and Trademark Office*